United States Patent
Hayashi

(10) Patent No.: US 8,053,939 B2
(45) Date of Patent: Nov. 8, 2011

(54) BRUSHLESS AC GENERATOR FOR VEHICLE

(75) Inventor: Hideyuki Hayashi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 12/595,932

(22) PCT Filed: Aug. 9, 2007

(86) PCT No.: PCT/JP2007/065608
§ 371 (c)(1),
(2), (4) Date: Oct. 14, 2009

(87) PCT Pub. No.: WO2009/019779
PCT Pub. Date: Feb. 12, 2009

(65) Prior Publication Data
US 2010/0301689 A1    Dec. 2, 2010

(51) Int. Cl.
H02K 9/04 (2006.01)
H02K 9/06 (2006.01)

(52) U.S. Cl. .............. 310/62; 310/63; 310/263

(58) Field of Classification Search .......... 310/58, 310/62, 63, 263, 59; H02K 9/04, 9/06
See application file for complete search history.

(56) References Cited

U.S. PATENT DOCUMENTS

| | | | | |
|---|---|---|---|---|
| 3,749,953 A | * | 7/1973 | Baumann et al. | 310/62 |
| 4,162,419 A | * | 7/1979 | DeAngelis | 310/266 |
| 4,424,464 A | * | 1/1984 | Ikegami | 310/68 D |
| 4,476,405 A | * | 10/1984 | Komurasaki | 310/60 R |
| 4,604,538 A | * | 8/1986 | Merrill et al. | 310/68 D |
| 4,952,828 A | * | 8/1990 | Yu-fang et al. | 310/68 D |
| 5,093,591 A | * | 3/1992 | Kitamura et al. | 310/62 |
| 5,177,388 A | * | 1/1993 | Hotta et al. | 310/114 |
| 5,235,229 A | * | 8/1993 | Tanaka et al. | 310/62 |
| 5,751,079 A | * | 5/1998 | Bagherpour et al. | 310/59 |
| 5,763,968 A | | 6/1998 | Hayashi et al. | |
| 6,239,519 B1 | * | 5/2001 | Kaelberer et al. | 310/61 |
| 6,586,853 B2 | * | 7/2003 | Ishida et al. | 310/62 |
| 6,700,235 B1 | * | 3/2004 | McAfee | 310/52 |
| 7,345,387 B2 | * | 3/2008 | Akita et al. | 310/63 |
| 2003/0030334 A1 | * | 2/2003 | Vasilescu et al. | 310/62 |

FOREIGN PATENT DOCUMENTS

| | | |
|---|---|---|
| JP | 9-289756 A | 11/1997 |
| JP | 2001-128397 A | 5/2001 |
| JP | 2002-136053 A | 5/2002 |

* cited by examiner

Primary Examiner — Quyen Leung
Assistant Examiner — Thomas Truong
(74) Attorney, Agent, or Firm — Sughrue Mion, PLLC

(57) ABSTRACT

To provide a brushless AC generator for a vehicle, which is capable of improving a cooing performance for an excitation coil and increasing an output of electric power generation with a simple structure.
An external fan 11 fixed to a shaft 10 outside the brackets 5 and 6 and an internal fan 34 fixed to a rotor assembled body 21 formed from a first rotor pole 22 and a second rotor pole 23 united into one body, the internal fan 34 having fan blade 34a provided in a valley part 22b between claw poles 22a of the first rotor pole 22, are provided. The external fan 11 and the internal fan 34 are used to generate an air flow for cooling a stator core 3, the rotor assembled body 21, an excitation core 31 and an excitation coil 33.

6 Claims, 4 Drawing Sheets

[FIG. 7]
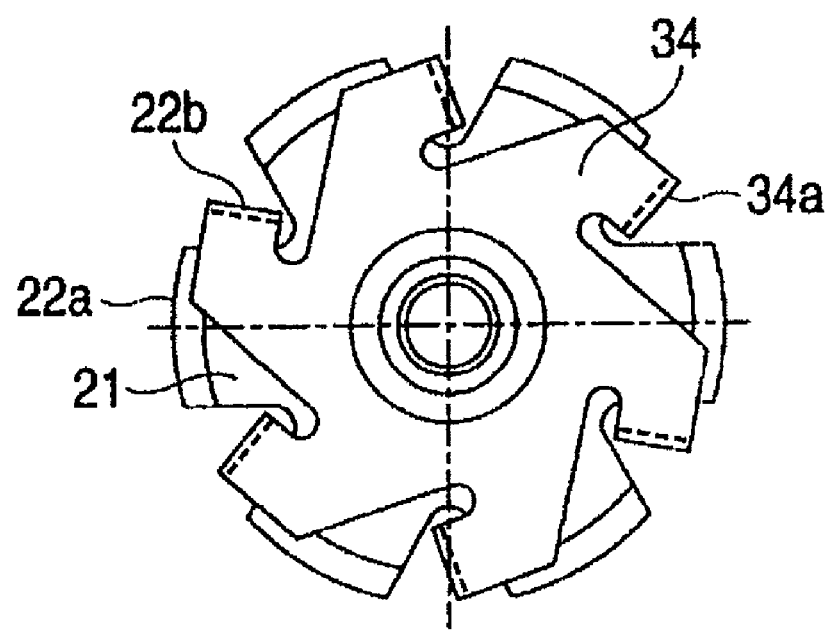

BRUSHLESS AC GENERATOR FOR VEHICLE

TECHNICAL FIELD

The present invention relates to a brushless AC generator for a vehicle, which is mounted to a vehicle such as an automobile, a bus and a truck.

BACKGROUND ART

Generally, the brushless AC generator for a vehicle of this type is arranged, as disclosed in Patent Reference 1, for example, so that a cylindrical casing formed by uniting a pair of brackets would contain component members such as a rotating shaft, a rotor, a ring-shaped excitation coil and a ring-shaped stator coil to generate an air flow along the component members by means of an external fan provided in the rotating shaft outside the bracket and to cool the air flow.
Patent Document 1: JP-A-2001-211608

DISCLOSURE OF THE INVENTION

Problems that the Invention is to Solve

Such a brushless AC generator for a vehicle is required to perform cooling by ventilation to an excitation coil since the excitation coil is fixed to a bracket. An external fan provided outside the bracket, however, has an inner diameter of the area of a fan blade, which influences the wind quantity, the inner diameter being restricted by an outer diameter of bearings. On the other hand, the life of the bearings tends to be elongated. This requires a diameter size to be enlarged as much as possible. Accordingly, the inner diameter of the fan blade of the external fan cannot be made so small.

Further, a path of winds for cooling extends effectively within a range of a width of the external fan blade. This causes difficulty in generation of an effective wind flow to the excitation coil provided on an inner side of the inner diameter of the fan blade of the external fan. Accordingly, it is difficult to cool the excitation coil. This makes improvement in output of electric power generation difficult.

In view of the above, an object of the invention is to provide a brushless AC generator for a vehicle, which is capable of improving a cooling performance for an excitation coil and increasing an output of electric power generation with a simple structure.

Means for Solving the Problems

The brushless AC generator for a vehicle in accordance with the invention is a brushless AC generator for a vehicle comprising: a pair of brackets for holding a shaft through bearings; a stator core having a stator coil held between the brackets; a rotor assembled body fixed to the shaft so as to be faced to the stator core, the rotor assembled body being formed into the shape of a cylinder from a first rotor pole having plural claw poles in a circumferential direction at even intervals and a second rotor pole having plural claw poles provided between the former plural claw poles in a circumferential direction at even intervals, the first and second rotor poles being united into one body; a cylindrical excitation core provided in the rotor assembled body and fixed to an inner surface of the bracket; an excitation coil wound around the excitation core; an external fan fixed to a shaft outside the bracket; and an internal fan fixed to the rotor assembled body, the internal fan having fan blade provided in a valley part between the claw poles of the first rotor pole, the brushless AC generator for a vehicle characterized in that the external fan and the internal fan are used to generate an air flow for cooling at least the stator core, the rotor assembled body, the excitation core and the excitation coil.

Advantage of the Invention

In accordance with the invention, achieved can be a brushless AC generator for a vehicle in which a cooling performance for an excitation coil is improved, the brushless AC generator for a vehicle having a high output and high reliability and being maintenance-free.

An object, a characteristic, a point of view and an advantage of the invention other than the above may be further cleared from the following detailed description of the invention with reference to the drawings.

BRIEF DESCRIPTION OF THE DRAWINGS

FIG. 7 It is a top view of a first rotor pole provided with an internal fan.

DESCRIPTION OF REFERENCE SINGS AND NUMERALS

1: BRUSHLESS AC GENERATOR FOR VEHICLE
2: STATOR
3: STATOR CORE
4: STATOR COIL
5: CASING
6A: BRACKET
6B: BRACKET
7: THROUGH BOLT
8: BEARINGS
9: BEARINGS
10: SHAFT
11: EXTERNAL FAN
11a: FAN BLADE
12: PULLEY
13: RECTIFIER
14: REGULATOR
15: SCREW
21: ROTOR ASSEMBLED BODY
22: FIRST ROTOR POLE
22a: CLAW POLE
22b: VALLEY PART
23: SECOND ROTOR POLE
23a: CLAW POLE
24: RING BODY
31: EXCITATION CORE
32: BOLT
33: EXCITATION COIL

34: INTERNAL FAN
34a: FAN BLADE

BEST MODE FOR CARRYING OUT THE INVENTION

Embodiment 1

Now, described will be Embodiment 1 of the invention on the basis of the drawings.

Figure 1:
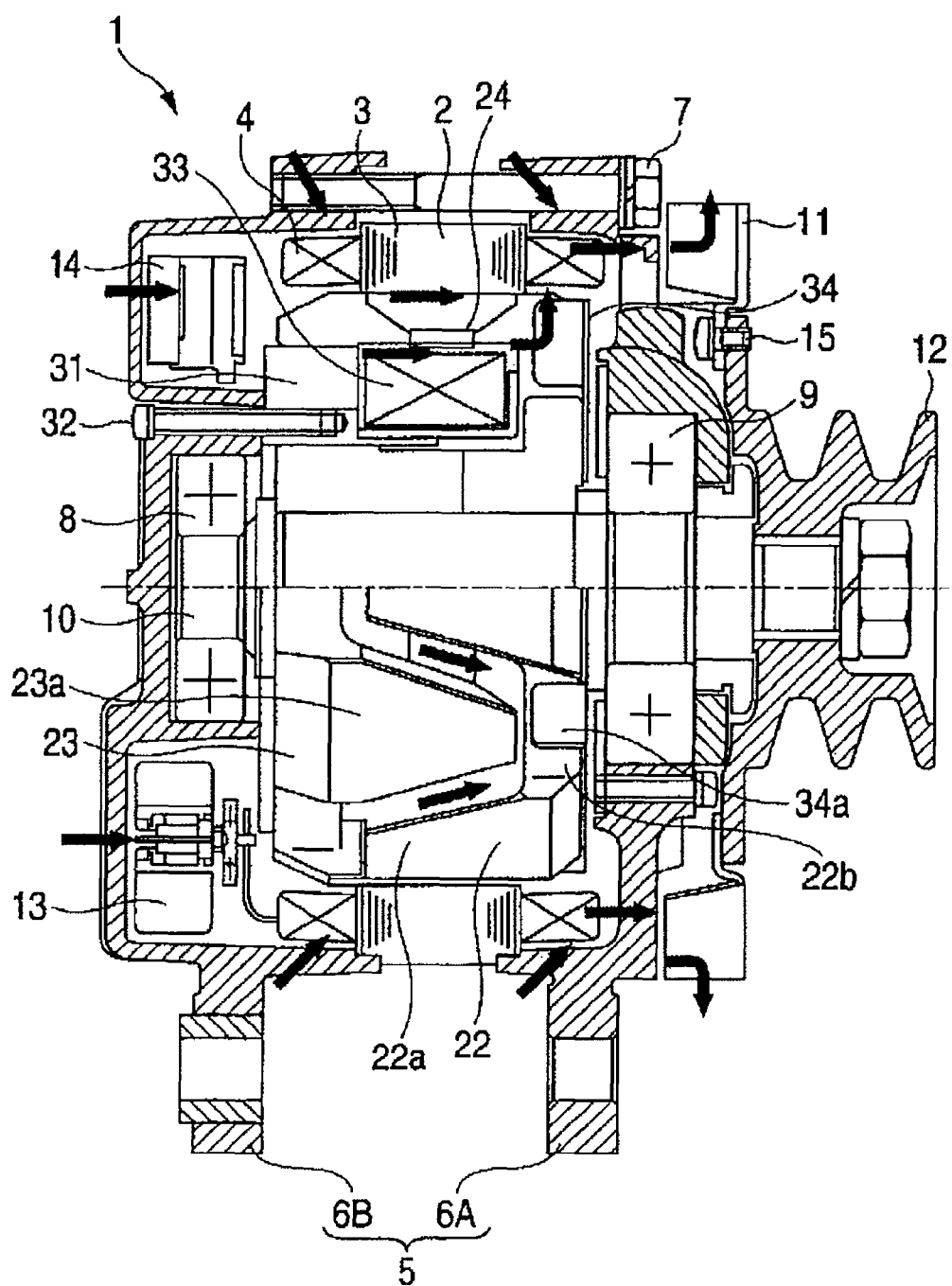
FIG. 1 It is a vertical side view of a brushless AC generator for a vehicle in accordance with Embodiment 1 of the invention.
Figure 2:
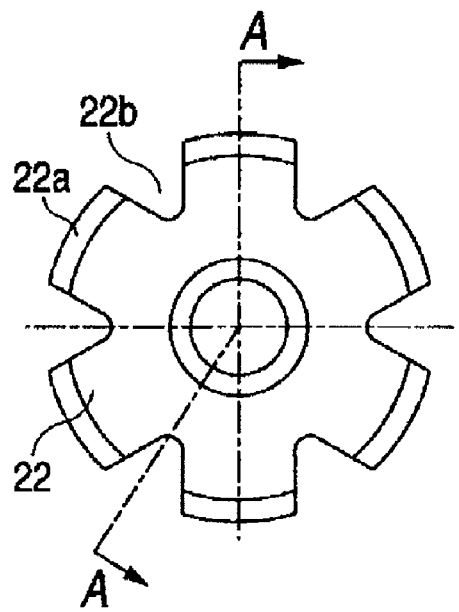
FIG. 2 It is a top view of a first rotor pole.
Figure 3:
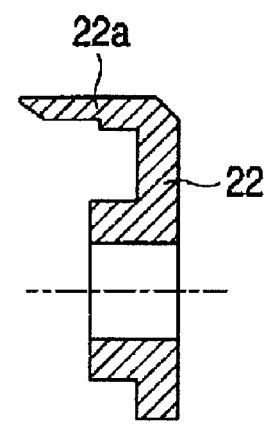
FIG. 3 It is a sectional view on arrow along a line A-A in FIG. 2.

A brushless AC generator 1 for a vehicle includes a casing 5 formed into the shape of a cylinder from a cylindrical front side bracket 6A having a lid and a cylindrical rear side bracket 6B having a lid, the brackets 6A and 6B being connected to each other by means of plural through bolts 7, as shown in FIG. 1. The casing 5 contains a shaft 10, a stator 2, a rotor assembled body 21, an excitation core 31, an excitation coil 33 and such. In the respective lids of the brackets 6A and 6B, provided are bearings 8 and 9 for freely rotatably supporting both ends of the shaft 10.

A pulley 12 is fixed to an outside end of the shaft 10, which projects outward from the front side bracket 6A. The power from an engine of a vehicle is arranged to be transmitted to the pulley 12 thorough a belt.

A stator 2 is formed from a stator core 3, which is formed by laminating plural ring-shaped core plates, and a stator coil 4, which is wound around the stator core 3. The stator 2 is held between the brackets 6A and 6B so that a part of an outer circumferential surface of the stator core 3 would be exposed to the outside air.

The rotor assembled body 21 is fixed to an outer circumference of a middle part in an axial direction of the shaft 10, which is housed in the casing 5, concentrically with the stator 2.

The rotor assembled body 21 is formed from a first rotor pole 22 having plural, six, for example, claw poles (claw-shaped magnetic poles) 22a at even intervals in a circumferential direction and a second rotor pole 23 having plural, six, for example, claw poles (claw-shaped magnetic poles) 23a provided between the former claw poles 22a at even intervals in a circumferential direction, the first and second rotor poles 22 and 23 being united into one body through a ring body 24, which is formed from non-magnetic metal such as stainless steel, for example, and which is fixed by pressuring or welding between the both rotor poles 22 and 23. The first rotor pole 22 is fixed to the shaft 10.

Figure 4:
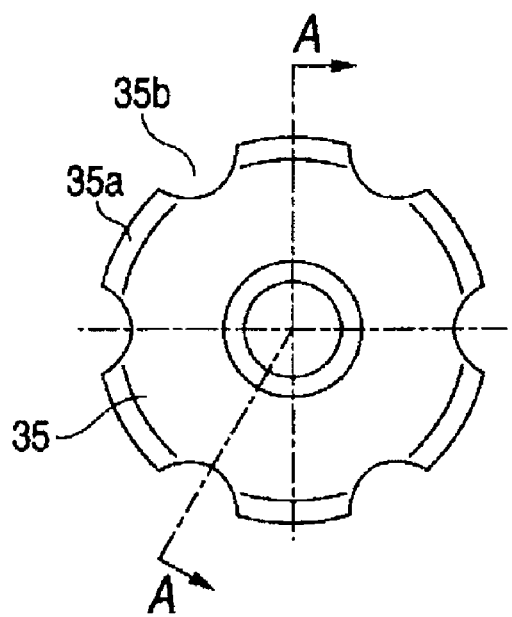
FIG. 4 It is a top view of a conventional first rotor pole.
Figure 5:
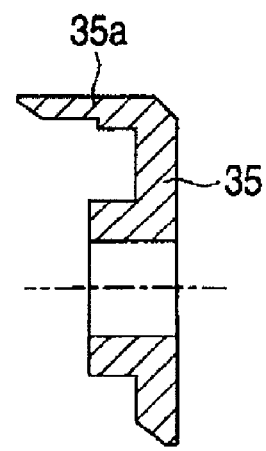
FIG. 5 It is a sectional view on arrow along a line A-A in FIG. 5.

In the rotor assembled body 21 arranged as described above, the first and second rotor poles 22 and 23 respectively have plural claw poles 22a and 23a, which are tapered toward a facing direction and vertically projectingly provided at predetermined intervals in the circumferential direction, the first and second rotor poles 22 and 23 being provided alternately with predetermined gaps. Particularly, a valley part 22b between the claw poles 22a of the first rotor pole 22 is formed into an acute angle deeper than a valley part 35b of a conventional rotor pole 35 having claw poles 35a (refer to FIGS. 4 and 5) so as to be able to provide a fan blade 34a of an internal fan 34 as described later.

The cylindrical excitation core 31 is fixed to the inside of the rotor assembled body 21 by means of plural bolts 32. The ring-shaped excitation coil 33 is wound around the excitation core 31.

The excitation coil 33 is fed with electricity from a battery for a vehicle and such, which are not shown. The excitation coil 33 excites the claw poles 22a and 23a to the north pole and the south pole, respectively.

Further, to the rear side bracket 6B, fixed are a rectifier 13 electrically connected to the stator 2 for converting AC power into DC power and a regulator 14 for adjusting an excitation current, which is to be made flow into the excitation coil 33, to control the quantity of electric power generation.

Moreover, an external fan 11 having a diameter larger than that of the pulley 12 is concentrically fixed to an outside surface of the bracket 6A of the pulley 12 by means of a screw 15. An internal fan 34 having a diameter smaller than that of the external fan 11 is concentrically provided on a side surface facing to the rear side bracket 6A of the first rotor pole 22 of the rotor assembled body 21.

The internal fan 34 has plural fan blades 34a, which are formed so as to be provided in the respective valley parts 22b between the claw poles 22a, as shown in FIG. 7.

Figure 6:
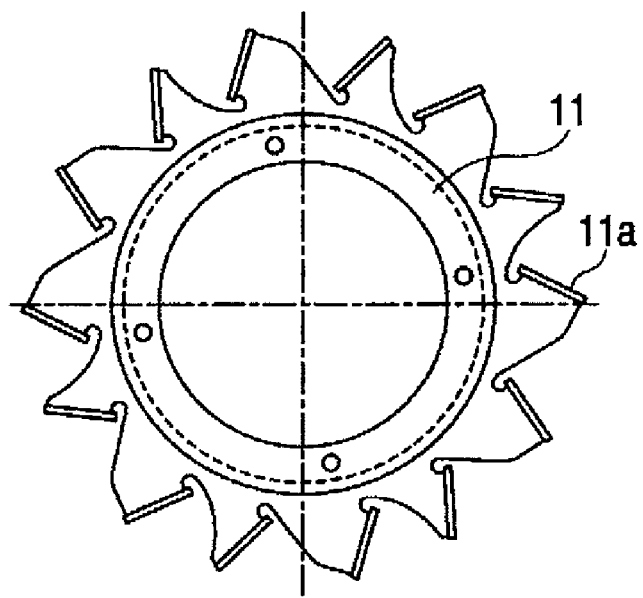
FIG. 6 It is a top view of an external fan.

The number of fan blades 34a of the internal fan 34 (6 in FIG. 7) is different from that of fan blades 11a of the external fan 11 shown in FIG. 6 (14 in FIG. 6). The outer diameter of the internal fan 34 is arranged to be larger than the outer diameter of the excitation core 31 and the excitation coil 33. The inner diameter of the internal fan 34 is arranged to be smaller than the outer diameter of the excitation core 31 and the excitation coil 33. The fan blade 34a of the internal fan 34 is mounted so as to be faced to a direction same as the fan blade 11a of the external fan 11 (on an excitation coil side).

The brushless AC generator for a vehicle 1 having such a structure is arranged that AC electromotive force be generated in the stator coil 4 in accordance with rotation of the shaft 10 to be rectified into a direct current by means of the rectifier 13, and further, the DC power be adjusted in voltage by means of the regulator 14 to be outputted from the brushless AC generator for a vehicle 1 as charging power for a battery, for example.

On the other hand, the external fan 11 and the internal fan 34 are driven together in accordance with rotation of the shaft 10. This causes an air flow to be generated along the stator 2, the rotor assembled body 21, the excitation core 31 and the excitation coil 33 through plural vents provided in the respective lids of the brackets 6A and 6B and an opening between the both brackets, as shown by arrows in FIG. 1, and to be cooled.

In this case, interaction of the external fan 11 with the internal fan 34 allows an effective air flow in the axial direction of the rotor, the air flow passing from the rear side bracket 6B to the front side bracket 6A, to be made. Further, the internal fan 34 having a diameter smaller than that of the external fan 11, the internal fan 34 being provided in the valley part 22b between the claw poles 22a of the first rotor pole 22, contributes to efficiently cooling of the excitation coil 33 in a limited space although the external fan 11 cannot achieve the cooling. This causes improvement in cooling performance for the excitation coil 33 to be achieved, so that an output can be increased.

In addition, the difference in number of the fan blades between the external fan 11 and the internal fan 34 causes a degree component of a sound of winds to be dispersed. This is effective for reducing noise of winds.

A variety of modifications and rectifications of the invention are available in practice for a skilled person concerned within a range not deviated from a scope and a spirit of the invention. It should be understood that the invention is not limited to the embodiment described in the specification.

The invention claimed is:

1. A brushless AC generator for a vehicle comprising:
a front side bracket and a rear side bracket for holding a shaft through bearings;
a stator core having a stator coil held between the brackets;
a rotor assembled body formed into the shape of a cylinder from a first rotor pole having plural claw poles in a circumferential direction at even intervals and a second rotor pole having plural claw poles provided between the former plural claw poles in a circumferential direction at even intervals, the first and second rotor poles being united into one body, the rotor assembled body being fixed to the shaft so that the first rotor pole is faced to the front side bracket;
a cylindrical excitation core provided in the rotor assembled body and fixed to an inner surface of the rear side bracket;
an excitation coil wound around the excitation core;
an external fan fixed to a shaft outside the front side bracket; and
an internal fan fixed on a side faced to the front side bracket of the first rotor pole to the rotor assembled body, the internal fan having a fan blade provided in a valley part between the claw poles of the first rotor pole,
wherein,
interaction of the external fan with the internal fan is achieved to generate an air flow passing from the rear side bracket to the front side bracket in the same direction and the airflow is used for cooling at least the stator core, the rotor assembled body, the excitation core and the excitation coil.

2. The brushless AC generator for a vehicle according to claim 1, wherein the internal fan has a diameter smaller than a diameter of the external fan.

3. The brushless AC generator for a vehicle according to claim 1, wherein the number of the fan blades of the internal fan is different from the number of fan blades of the external fan.

4. The brushless AC generator for a vehicle according to claim 1, wherein an outer diameter of the fan blade of the internal fan is larger than outer diameters of the excitation core and the excitation coil while an inner diameter of the fan blade of the internal fan is smaller than outer diameters of the excitation core and the excitation coil.

5. The brushless AC generator for a vehicle according to claim 1, wherein a direction of the fan blade of the internal fan is same as a direction of a fan blade of the external fan and on an excitation coil side.

6. The brushless AC generator for a vehicle according to claim 1, wherein the internal fan and the external fan are provided on a same side of the stator core.

* * * * *